United States Patent [19]

Middleton, Sr.

[11] 3,976,248

[45] Aug. 24, 1976

[54] POLYURETHANE POUR GUN

[75] Inventor: Gary Lee Middleton, Sr., San Lorenzo, Calif.

[73] Assignee: Polymir Industries, Inc., Oakland, Calif.

[22] Filed: Apr. 28, 1975

[21] Appl. No.: 572,059

[52] U.S. Cl. .................. 239/416.1; 239/414; 239/428; 239/434; 222/145
[51] Int. Cl.² .......................................... B05B 7/04
[58] Field of Search ............ 222/145, 190; 239/112, 239/411, 414, 415, 416.1, 417.5, 427.5, 428, 429, 434, 525–528

[56] References Cited
UNITED STATES PATENTS

| | | | |
|---|---|---|---|
| 2,991,015 | 7/1961 | Standlick | 239/415 X |
| 2,992,194 | 7/1961 | Paulsen | 239/428 X |
| 3,240,432 | 3/1966 | Boettler | 239/112 X |
| 3,366,337 | 1/1968 | Brooks et al. | 239/416.1 X |
| 3,399,837 | 9/1968 | Frick | 239/415 |
| 3,822,041 | 7/1974 | Reinold | 239/112 X |

Primary Examiner—John J. Love
Attorney, Agent, or Firm—Phillips, Moore, Weissenberger

[57] ABSTRACT

A gun is disclosed which is adapted to thoroughly intermix a pair of mutually soluble liquid reactants while pourably delivering the resulting mixture at substantially atmospheric pressure and before any substantial reaction has occurred. The structure of the mixing chamber of the gun is described in detail which structure does not include any baffles or other means impeding the free flow of the reactants through the mixing chamber. The preferred embodiment comprises a disposable tube portion and although the gun is essentially self-cleaning, a means for introducing a cleaning solvent into the mixing chamber is disclosed.

10 Claims, 9 Drawing Figures

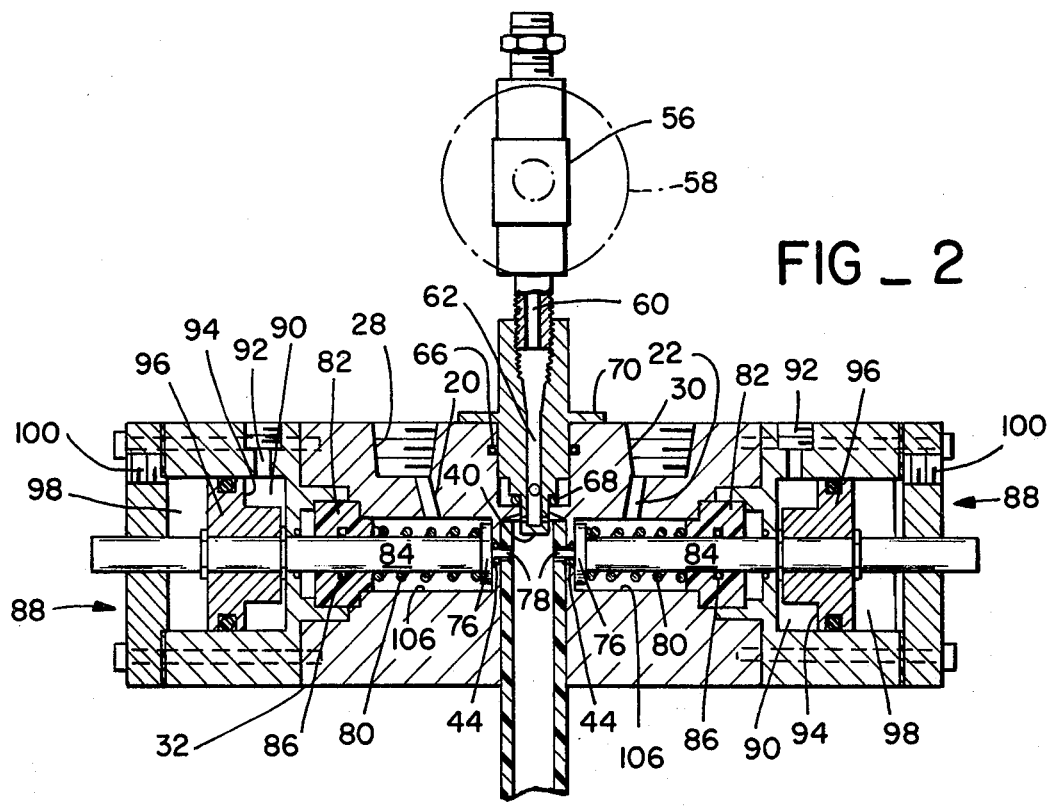
FIG_2
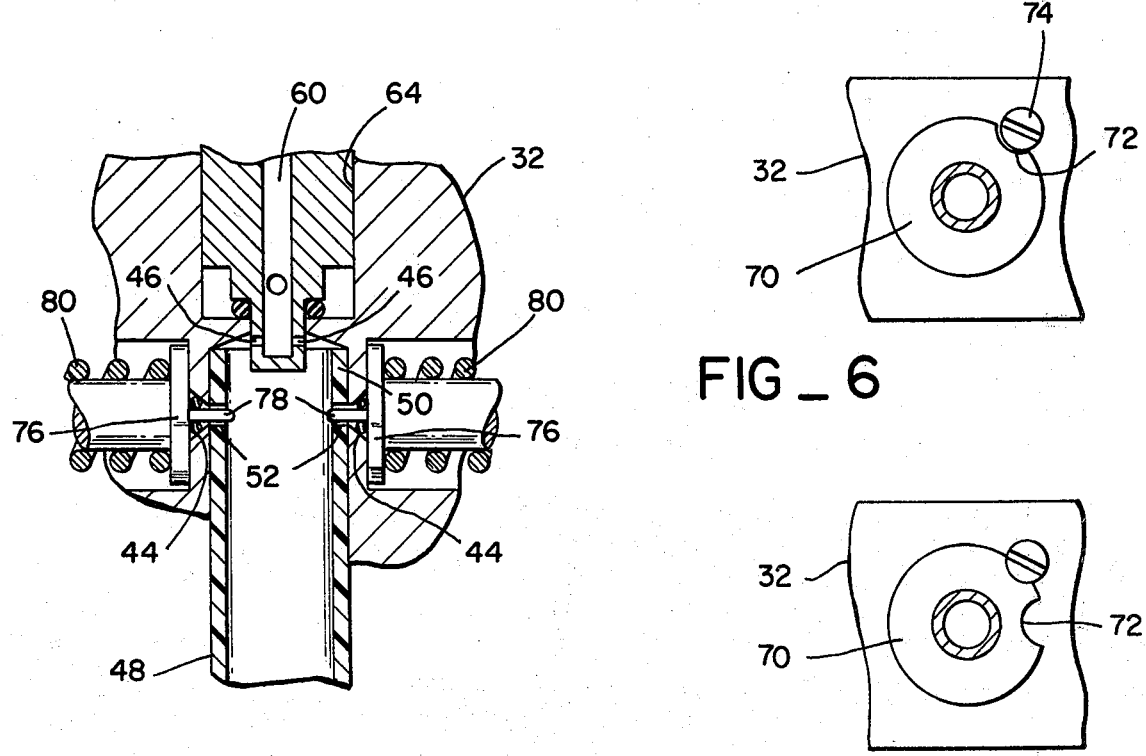
FIG_3
FIG_6
FIG_7

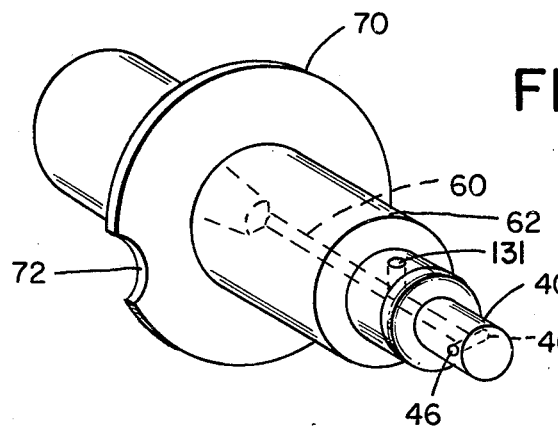
FIG_5
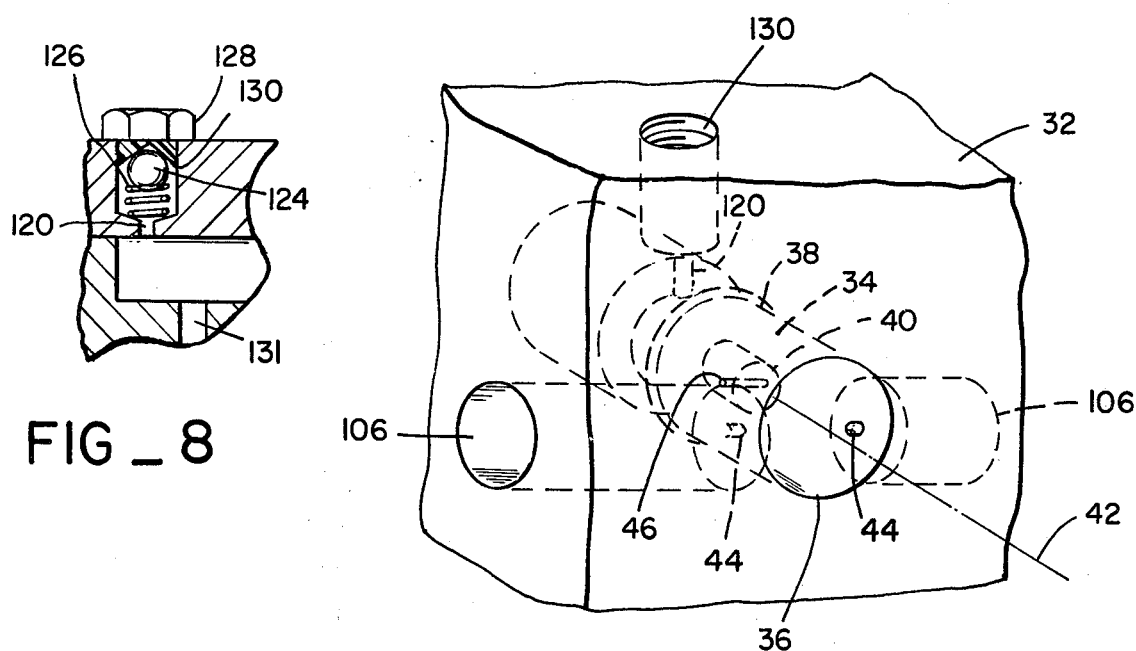
FIG_8
FIG_4
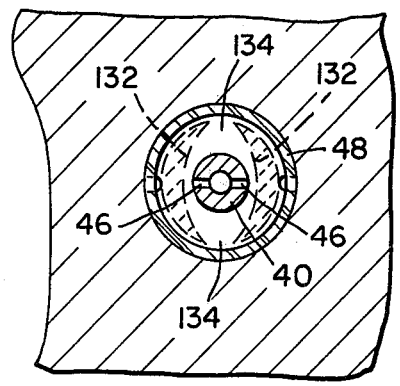
FIG_9

POLYURETHANE POUR GUN

BACKGROUND OF THE INVENTION

1. Field of the Invention

The invention is concerned with guns for thoroughly intermixing mutually soluble liquid reactants while pourably delivering the resulting mixture at substantially atmospheric pressure. More particularly the invention is concerned with a gun adapted to intermix an isocyanate with a polyhydroxy resin (a polyol), at least one of said isocyanate and said polyol including a catalyst therewith and to pourably deliver the resulting mixture at substantially atmospheric pressure and before any significant amount of reaction has occurred between the isocyanate and the polyol.

2. Prior Art

Prior art guns in which isocyanates have been intermixed with polyols and a catalyst for the reaction therebetween have generally been of the spray gun variety. That is, sufficient of the catalyst has been present so that the reaction between the isocyanate and the polyol proceeds within the mixing chamber of the gun at a very rapid rate thereby generating large quantities of gas whereby the reactants are thoroughly intermixed with each other due both to the violence of the reaction and to the fact that they are expelled from the gun through an orifice or nozzle in a foamy spray by the high pressures and gas formation involved. Examples of such prior art devices may be found, for example, in each of U.S. Pat. Nos. 3,366,337; 3,623,669; 3,690,557; 3,799,403 and 3,850,371.

When a gun has been desired for the mixing of an isocyanate with a polyol in the presence of a relatively small amount of catalyst or of a relatively slow acting catalyst whereby the mixture exits from the gun before significant foaming reaction can occur within the gun to thoroughly mix the components thereof, it has been necessary to provide a mixing chamber within the gun which includes baffles and other mechanical means therein to aid in the intermixing of the isocyanate with the polyol. This has led to a number of problems not the least of which is the expense of fabricating the complicated structure involved and the necessity for frequent cleaning of the baffles. In addition, it was generally necessary for the mixture to exit the gun at a pressure above substantially atmospheric in order to provide the desired mixing action.

SUMMARY OF THE INVENTION

Briefly, th invention comprises a gun adapted to thoroughly intermix a pair of mutually soluble liquid reactants while pourably delivering the resulting mixture. The gun comprises an elongated hollow cylindrical chamber of substantially constant internal diameter open at one end thereof. The other end of the chamber is re-entrantly closed to provide an annular volume at such other end by an air dispenser plug which has a pair of air discharge openings exiting latitudinally therefrom into such annular volume at generally 180° separation from one another. A pair of liquid ports enter the chamber opposite each other at a position further removed from such other end of the chamber than the air dispenser projects thereinto. The ports are generally coplanar with the longitudinal axis of the chamber and the air discharge openings. Means are provided which communicate with the air discharge openings to supply pressurized air thereto. Further, means are provided which communicate with each of the liquid ports for simultaneously supplying a different pressurized liquid, e.g., an isocyanate and a polyol, to each of them.

BRIEF DESCRIPTION OF THE DRAWINGS

The invention will be better understood by reference to the attached drawing of a preferred embodiment thereof in the FIGS. of which like numbers denote like parts throughout and wherein:

FIG. 2 illustrates in top partial section the body of th embodiment illustrated in FIG. 1.

FIG. 3 illustrates, in section, a blown-up section of FIG. 2.

FIG. 4 illustrates in enlarged phantom perspective the interior of the embodiment illustrated in FIG. 1.

FIG. 5 illustrates the removable air dispenser which projects into the interior of the present embodiment of the invention.

FIG. 6 illustrates means for aligning the air dispenser of FIG. 5 for removal thereof.

FIG. 7 illustrates the alignment of the air dispenser of FIG. 5 when held in place.

FIG. 8 illustrates means for introducing a cleaning solvent through the air dispenser of FIG. 5.

FIG. 9 illustrates the flow pattern of air out of the air dispenser and within the mixing chamber of the present embodiment of the invention.

DETAILED DESCRIPTION OF THE PREFERRED EMBODIMENT

Figure 1:
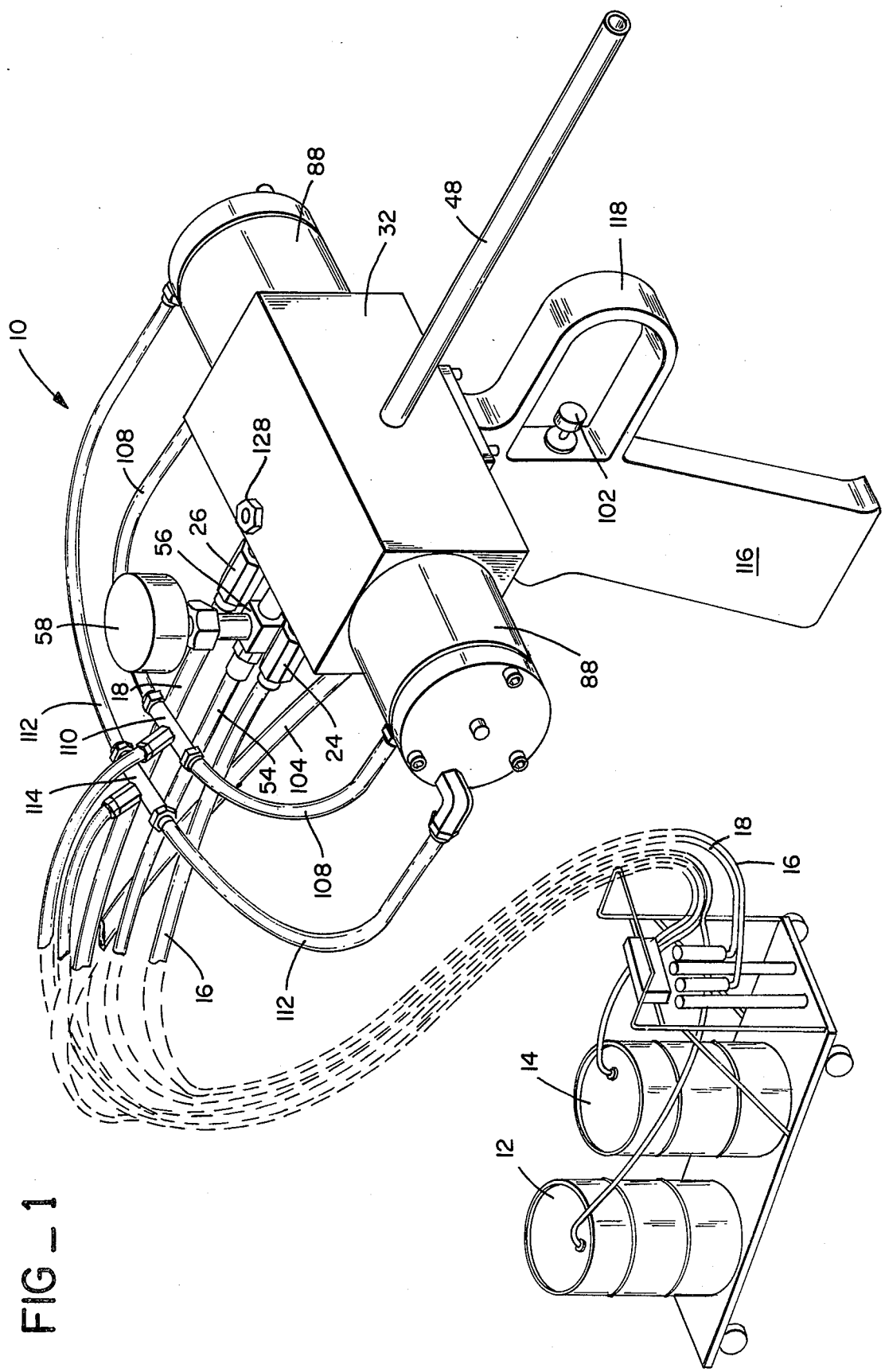
FIG. 1 illustrates in perspective a preferred embodiment of the present invention attached to pressurized air and pressurized liquid supplies therefor.

Referring first to FIG. 1, there is illustrated generally a gun 10 according to the preferred embodiment of the present invention along with a first liquid supply tank 12 and a second liquid supply tank 14. The liquids in the supply tanks 12 and 14 are different in nature. Generally one of the liquids will comprise a polyisocyanate and the other of the liquids will comprise a polyol. One of the liquids, generally the polyol will contain a catalyst for the reaction between the isocyanate and the polyol and will contain this in relatively low concentration or will contain a relatively slowly effective catalyst whereby the two liquids from the tanks 12 and 14 will be subsantially completely mixed within the gun 10 without significant generation of gas therein through reaction of the isocyanate with the polyol so that liquid rather than foam will be delivered by the gun 10 and thus liquid will be poured out of the gun rather than foam being sprayed out of the gun. Generally, the liquid from the tank 12 will be pumped under pressure via the conduit 16 and the liquid from the second liquid supply tank 14 will be pumped under pressure via the conduit 18, to the passages 20 and 22 (shown in FIG. 2) respectively. Connection of the conduit 16 to the passage 20 is provided by screw-on fitting 24 (FIG. 1) which attaches to threaded tap 28 (FIG. 2) and connection of conduit 18 is provided by screw-on fitting 26 (FIG. 1) which attaches to the threaded tap 30 (FIG. 2) in a usual manner. Each of the threaded taps 28 and 30 and the passages 20 and 22 are formed within a single body 32 preferably of stainless steel or other non-reactive material.

As shown in FIG. 4, there is formed within the body 32 an elongated chamber 34 open at one end 36 thereof. The other end 38 of the elongated chamber 34 is closed by an air dispenser 40 which projects into the elongated chamber 34 along the longitudinal axis 42 thereof to provide an annular volume. A pair of liquid ports 44 enter the chamber generally opposite each other at a position further removed from the end 38 of the chamber 34 than the air dispenser 40 projects thereinto (FIG. 3). Air dispenser 40 dispenses air into the annular volume through a pair of air discharge openings 46 which exit latitudinally from the air dispenser 40 and are generally at 180° separation from one another. The pair of liquid ports 44 are generally coplanar with the axis of the chamber 34 and the air discharge openings 46. In this manner, a full and uniform mixing of the liquids form the tanks 12 and 14 is promoted as is explained in more detail below.

The actual mixing chamber comprises a tube 48, generally of a plastic material such as polypropylene or polyethylene, as illustrated in FIG. 1–3, and is adapted to have one end 50 thereof fit firmly but removably within the elongated chamber 34 from the first end 36 thereof. The end 50 of the tube 48 surrounds the air dispenser 40 in spaced relation thereto to partially fill the annular volume at the other end of the chamber 34. The other end of the tube 48 extends from the open end 36 of the chamber 34 and provides a passageway for pouring the mixture of the liquids which come from the tanks 12 and 14 and in which the mixing of these two liquids occurs, as will be explained hereinafter. The tube 48 includes a pair of holes 52 which pass therethrough adjacent the one end 50 of said tube 48. The holes 52 are aligned one against each of the ports 44 to receive the output from said ports 44 when the tube 48 is fully inserted in the chamber 34.

Means are provided which communicate with the air discharge openings 46 of the air dispenser 40, which means comprises the tube 54 which is connected to an air supply for supplying pressurized air via a needle valve 56, controlled in the usual manner by a handle 58, and a passage 60 which passes through the air dispenser 40. The air dispenser 40 has extending therefrom and generally integral therewith a cylindrical member 62 through which the passage 60 extends. The cylindrical member 62 fits within a cylindrical receptacle 64 within the body 32. An air-tight fit of the cylindrical member 62 within the cylindrical receptacle 64 is assured by the use of the O-rings 66 and 68 whereby a simple press fit which is gas-tight results. The cylindrical member 62 includes a flange portion 70 which fits against the body 32 and surrounds the cylindrical receptacle 64 therein. Generally the flange 70 will have an indentation 72 at one position therein to aid in quick insertion and removal thereof. The indentation 72 in the preferred embodiment of the invention is adapted to pass over the head of a bolt 74 which bolt head is upraised a distance equal to the thickness of the flange 70 whereby the cylindrical member 62 can be quickly shoved into the cylindrical receptacle 64 past the bolt 74 and then the cylindrical member 62 can be rotated as illustrated in FIG. 6, to lock the cylindrical member 62 in place. Removal of the cylindrical member proceeds in a reverse manner.

The control of the supply of liquid from the first supply tank 12 and the second supply tank 14 proceeds as follows: Referring primarily to FIGS. 2 and 3, it is seen that a pair of discs 76, each with a finger 78 projecting centrally therefrom and through a different one of the pair of liquid ports 44 and a different one of the pair of holes 52 in the tube 48, are biased to extend through said ports 44 and holes 52 and thereby to prevent flow therethrough by the pair of springs 80, each of which act between a disc 76 and one of a pair of stops 82. The discs 76 are generally integral with and form the ends of a pair of rods 84 which are slidably guided by the stops 82 through use of the O-rings 86. Movement of the pair of rods 84 is controlled by a pair of simultaneously operated, double-acting, pneumatic cylinders 88.

Thus, the pair of rods 84 are retracted by supplying pressurized air to the chambers 90 of the cylinders 88 via conduits 92. The pressurized air in each cylinder 88 acts against the forward portion 94 of a pneumatic piston 96 which is fixedly attached to one of the rods 84. When the pair of rods 84 are to be extended to close off the liquid ports 44 and the pair of holes 52, air pressure is provided via the passage 100 to the backside 98 of the piston 96 thereby causing the pneumatic pistons 96 and rods 84 attached thereto, to urge the fingers 78 of the discs 76 into the liquid ports 44 and holes 52. The spring 80 aids in so urging the pair of discs 76 thus providing a fast and positive shut-off action. As is clear from FIG. 2, the pistons 84 must be drawn back only sufficiently so that the liquid from the first supply tank 12 and the second supply tank 14 respectively flow through the passages 20 and 22 and around and past the springs 80 and discs 76 into the ports 44.

Control of the pair of pneumatic cylinders 88 is provided by the trigger 102. When the trigger 102 is not depressed, then the springs 80 and pressure in the backside chambers 98 keep the fingers 78 within the ports 44 and the holes 52. When the trigger 102 is depressed, an electrical signal proceeds as represented by line 104, which directs pressure simultaneously to both of the chambers 90 while simultaneously connecting both of the chambers 98 for exhaust to the atmosphere. The increased pressure within both of the chambers 90 causes both of the pistons 96 to retract both of the rods 84 whereby both of the fingers 78 leave the ports 44 and the disc 76 is urged backwardly against the force of the spring 80 until flow therearound is possible.

The fluids in the first liquid supply tank 12 and the second liquid supply tank 14 are then pumped under pressure via the lines 16 and 18, respectively, the fittings 24 and 26, respectively, and the passages 20 and 22, respectively, to a pair of bores 106 and therefrom through the liquid ports 44 and the holes 52 and into the interior of the tube 48 adjacent the one end 50 thereof. Pressure to the chamber 90 is supplied via the pair of tubes 108 form the T-fitting 110 and pressure to the chamber 98 is provided by the pair of tubes 112 via the T-fitting 114. A hand grip 116 aids the operator in making use of the gun 10 and most particularly of the trigger 102. A guard 118 is provided to prevent accidental depressing of the trigger 102.

Referring to FIGS. 4 and 9, the various structural features of the gun which are believed to result in the improved mixing of the two liquids according to the teaching of this invention are illustrated. FIG. 4 is a fragmentary perspective view of the body 32 with the air dispenser 40 as well as various chambers, ports and bores in the body and the air dispenser shown in phantom. The tube 48 which actually forms the mixing chamber has been omitted in FIG. 4 for clarity of illustration, however, it will be understood that such tube extends from the bore 36 with its axis generally coincident with the axis 42 of the bore 36.

Thus, it will be seen that the two liquids to be mixed are present under pressure in the bores 106 and are projected with considerable force through the ports 44 and into the mixing tube 48 in the form of two jet sprays in diametric opposition to each other. It is believed that the liquids from the bores 106 tend to be "atomized" in passing through the ports 44 and their impingement upon each other from opposite sides of the tube 48 in the chamber 36 will produce a substantial intermixing thereof.

As can be seen from FIGS. 3 and 4, the diameter of the mixing tube 48 is quite large in comparison to the diameter of the ports 44 and holes 52 through which the liquids enter the tube 48. Thus, although the liquids are under high pressure in the bores 106 upon being sprayed through the ports 44 and holes 52 into the tube 48, they are under substantially atmospheric pressure and contribute only slightly to the pressure within the open ended mixing tube 48.

Similarly, the air discharged into the mixing tube 48 from the air discharge openings 46 in the air dispendser 40 although increasing the pressure within the end 50 of the tube 48 above atmospheric does not produce a large pressure differential at the open end of the mixing tube 48 but is adjusted to produce the desired pouring action of the mixed liquids therefrom.

As shown in FIG. 9, which is a cross-sectional view taken through the air discharge openings 46 in the air dispenser 40 looking toward the open end of the mixing tube 48, the air issuing from the air discharge openings does tend to produce an air pressure profile indicated by the dotted lines 132 in the end 50 of the mixing tube 48 surrounding the air dispenser 40. Thus, areas of high pressure are indicated by the dotted lines 132 and areas of low or atmospheric pressure are indicated by the blank spaces 134. This situation is believed to result in a twisting or vortex action along the length of the mixing tube 48, resulting in further mixing of the two liquids as they are urged toward the open end of the mixing tube 48.

In any event, it has been found that the annular volume defined about the end of the air dispenser 40 within the end 50 of the mixing tube 48 remains substantially free of both liquids as well as a mixture thereof, thereby minimizing the need for cleaning of the gun structure as well as fouling of the air discharge openings 46. Similarly, it has been found that the ports 44 and holes 52 through which the liquids enter the mixing tube 48 remained clear even after extended operation due to the structural arrangements described hereinabove.

It will be understood that if any amount of the mixed liquids remain in the mixing tube 48 after the release of the trigger 102, such mixed liquids will be urged to exit the open end of the mixing tube 48 by the fact that the air continues to be discharged from the air discharge openings 46 of the air dispenser unless such air is turned off by means of the needle valve 56, Ordinarily, the needle valve 56 will be turned off only at the end of a working day or during a period of extended non-use of the gun. Thus, it is possible at these times that a small amount of mixed liquid will remain within the mixing tube 48 and after a period of time will begin to react producing a foam which would clog the mixing tube 48. If this should happen, the mixing tube 48 could be simply disposed of without great loss since it consists of a short length of plastic tubing or relatively small value.

However, out of an abundance of caution and in order to insure that no mixed liquids remain within the end 50 of the mixing tube 48 where a foaming action thereof might tend to foul the air discharge openings 46 or the ports 44 and holes 52, it may be desirable to flush the mixing tube 48 with a solvent. To this end, the preferred embodiment of this invention includes a means for introducing a solvent into the mixing tube in a manner calculated to produce best results.

Such means is best shown in FIGS. 1, 4, 5 and 8 and comprises a threaded bore 130 in the body 32 opening through the top of the body 32 in the normal operating position thereof and having its axis perpendicular to the axis of the circular receptacle 64 which receives the cylindrical extension 62 of the air dispenser 40. A passageway 120 communicates between the threaded bore 130 and the circular receptacle 64.

As best shown in FIG. 5, the cylindrical extension 62 is provided with a length of reduced diameter immediately adjacent the air dispenser 40 and a passageway 131 communicating with the air passage 60 is provided in such length of reduced diameter. Thus, when the cylindrical extension 62 of the air dispenser 40 is received within the circular receptacle, an annular volume is formed as best shown in FIGS. 2 and 3 into which the passageway 120 communicates from the bore 130. Referring to FIG. 8, a compression spring 126 is received within the threaded bore 130 and carries a ball 124 on its upper extremity. An apertured nut 128 is screwed into the threaded bore 130 and has a sealing surface on its lower extremity normally in contact with the ball 124 and tending to partially compress the spring 126 in order to insure air-tight sealing contact between the ball 124 and the sealing surface on the apertured nut 128.

In order to introduce a solvent, the needle valve 56 is closed to remove the air pressure from the passageways 60 and 131 and the ball 124 is forced downwardly against the force of the spring 126 to provide an opening for entry of the solvent fluid. The solvent will enter the annular volume provided in the circular receptacle 64 described above, and from hence into the air passageway 60 through the passage 131 due to the force of gravity and an appropriate tilting of the gun structure. The solvent will then tend to be discharged from the air discharge openings 46 into the mixing tube 48.

It is believed that those skilled in the art will make obvious changes and modifications in the structure of the preferred embodiment as shown in the drawing and specifically described hereinabove. For example, although it is believed to be preferable for the liquid inlet ports 44 to be diametrically opposed to each other, as shown and described, such arrangement is not believed to be essential. However, it is believed to be essential that the internal diameter of the mixing tube be at least about three times the diameter of the liquid inlet ports. In a preferred embodiment of this invention, the liquid inlet ports had a diameter of 0.060 to 0.064 inch and the internal diameter of the mixing tube was 0.250 inch.

Similarly, it is not necessary that the air discharge openings 46 be diametrically opposed to each other or that they lie in the same plane as the liquid inlet ports 44 and axis 42 of the mixing tube, although this arrangement is preferred. However, the cross-sectional area of the mixing tube must always be at least about five times the total cross-sectional area of the air discharge openings although it would be possible to use a single air discharge opening 46 or more than two such air discharge openings. It is essential, according to the teaching of this invention, however, that an open-ended annular volume be defined within the end 50 of the mixing tube 48 and that the air be discharged into such annular volume with a radial velocity component through one or more openings in the walls which define such open ended annular volume. In a preferred embodiment of this invention, in which the mixing tube had an internal diameter of 0.250 inch, the external diameter of the air dispenser 40 was 0.220 inch. The annular volume defined thereby had an axial length of about .125 inch and a pair of diametrically opposed air discharge openings having a diameter of 0.025 inch, spaced 0.060 inch from the free end of the air dispenser, were provided.

It is essential, according to this invention, that the liquid inlet ports 44 not be provided in the walls which define the open-ended annular volume at the end 50 of the mixing tube 48. In addition, the liquid inlet ports 44 and holes 52 through the mixing tube should not be spaced too far from the open end of the annular volume in order to obtain maximum benefit from the air flow out of such annular volume. It has been found that the mixing of the liquids is an estimated one thousand times less thorough when the air flow is turned off than when the gun is operating normally. In addition, the air flow tends to provide a scrubbing action across the liquid inlet ports to prevent fouling thereof as well as preventing any of the mixed liquids from entering into or remaining in the annular volume at the end 50 of the mixing tube 48. In a preferred embodiment of this invention, the mixing ports 48 and holes 52 were spaced 0.250 inch from the end 50 of the mixing tube where the mixing tube had an internal diameter of 0.250 inch.

Finally, it has been found that the axial length of the mixing tube 48 may vary. However, it must not be so long that any appreciable reaction will occur between the two liquids before they exist from the mixing tube. More importantly, it has been found that the axial length of the mixing tube 48 must be at least about ten times its internal diameter in order to provide for the efficient mixing of the liquids before they exit from the tube. In preferred embodiments of this invention in which the mixing tube had an internal diameter of 0.250 inch axial lengths of six inches and four and one-half inches have been found to provide thoroughly intermixed liquids at the exits thereof.

As emphasized above, the pressures within the mixing tube 48 never exceed atmospheric by an amount more than is necessary to provide a continuous flow of mixed liquids from the open end thereof. Thus, the interference fit between the mixing tube 48 and the chamber 36 need not be more than the minimum necessary to insure that the end 50 of the mixing tube 48 will be firmly retained within the chamber 36 in operation. The fingers 78 which close the liquid inlet ports 44 and project into the holes 52 in the side walls of the mixing tube 48 of course, help to hold the mixing tube 48 within the chamber 36. Such fingers also help to insure that the holes 52 through the walls of the mixing tube 48 will be properly aligned with the liquid outlet ports 44. However, it is desirable that the fingers 78 not prevent the removal of one mixing tube 48 and the insertion of a new mixing tube 48 into the chamber 36 and it has been found that by rounding the ends of the fingers 78 as shown, there will be sufficient give in the end 50 of the mixing tube 48 and the springs 80 to enable such replacement operation to be easily and quickly carried out. It may, of course, be desirable to provide a pair of grooves in the exterior wall of the tube 48 extending from the end 50 thereof to receive the fingers 78 during insertion and removal of the tube 48 and this has been done in preferred embodiments of this invention with satisfactory results.

The foregoing, and other obvious changes and modifications may be made without departing from the spirit and scope of this invention. In addition, of course, the specific controls such as the electrical trigger 102, pneumatic valves 88 and needle valve 56 are not essential elements of this invention so long as appropriate means for providing their functions are included.

What is claimed is:

1. Apparatus for thoroughly mixing two mutually soluble liquid reactants and delivering the resulting mixture at substantially atmospheric pressure and before any substantial reaction has occurred there between comprising:
   a. an elongated cylindrical mixing chamber of substantially constant internal diameter open at one end thereof and closed at the other end thereof by reentrant means providing an open ended annular volume at said other end thereof;
   b. means for introducing pressurized air into said open ended annular volume including an air discharge opening in wall defining said open ended annular volume;
   c. means for introducing a first one of said two liquid reactants into said chamber adjacent said open end of said annular volume including a first liquid discharge port through the wall of said chamber at a point spaced from said open end of said annular volume toward said open end of said chamber; and
   d. means for introducing the other one of said two liquid reactants into said chamber adjacent said open end of said annular volume including a second liquid discharge port through the wall of said chamber at a point spaced from said open end of said annular volume toward said open end of said mixing chamber.

2. Apparatus as claimed in claim 1, wherein said first and second liquid discharge ports are diametrically opposed to each other in said wall of said mixing chamber.

3. Apparatus as claimed in claim 2 wherein said means for introducing pressurized air in said open ended annular volume includes a pair of diametrically opposed air discharge openings in a wall defining said open ended annular volume.

4. Apparatus as claimed in claim 3 wherein the centers of said air discharge openings and said first and second liquid discharge ports all lie in a common plane which includes the axis of said cylindrical mixing chamber at said closed end thereof.

5. Apparatus as claimed in claim 1 wherein said elongated cylindrical mixing chamber has a length at least about ten times as great as said internal diameter thereof and said air discharge opening and said liquid discharge ports all have a diameter less than about one third of said internal diameter of said mixing chamber.

6. Apparatus as claimed in claim 1 wherein said reentrant means comprises a body having a reentrant chamber therein and said elongated cylindrical mixing chamber comprises a tube open at both ends with one end thereof received within said reentrant chamber with an interference fit and with said one end abutting the bottom of said reentrant chamber.

7. Apparatus as claimed in claim 6 wherein said body includes a first liquid passageway terminating in a port in registry with said first liquid discharge port through the wall of said mixing chamber, a second liquid passageway terminating in a port in registry with said second liquid discharge port through the wall of said mixing chamber and means for selectively closing said liquid discharge ports.

8. Apparatus as claimed in claim 7 wherein said body includes a bore therethrough and a separable plug received in one end of said bore in air tight relation thereto with a free end of reduced diameter within said bore whereby said bore and free end of said separable plug of reduced diameter provide said reentrant chamber in said body.

9. Apparatus as claimed in claim 8 wherein said separable plug includes a passageway therethrough terminating in a port in the sidewall of said free end of reduced diameter thereof which port provides said air discharge opening into said open ended annular volume.

10. Apparatus as claimed in claim 9 including a source of pressurized air communicating with said passageway through said separable plug, means communicating with said first liquid passageway supplying one of said two liquid reactants under pressure thereto and means communicating with said second liquid passageway supplying the other of said liquid reactants under pressure thereto.

* * * * *

UNITED STATES PATENT AND TRADEMARK OFFICE
CERTIFICATE OF CORRECTION

PATENT NO. : 3,976,248
DATED : August 24, 1976
INVENTOR(S) : GARY LEE MIDDLETON, SR.

It is certified that error appears in the above-identified patent and that said Letters Patent are hereby corrected as shown below:

Column 1, line 51, "th" should be --the--.
Column 2, line 13, "th" should be --the--.
Column 5, line 68, "or" should be --of--.
Column 6, line 42, "hence" should be --thence--.
Column 7, line 40, "exist" should be --exit--.

Signed and Sealed this

Twenty-first Day of June 1977

[SEAL]

Attest:

RUTH C. MASON
Attesting Officer

C. MARSHALL DANN
Commissioner of Patents and Trademarks